United States Patent [19]

Rigazzi

[11] Patent Number: 6,161,516

[45] Date of Patent: Dec. 19, 2000

[54] PROCESS FOR THE FORMATION OF A FUEL MIXTURE AND FOR ITS IGNITION IN A PRE-CHAMBER THAT IS OPEN TOWARD THE CYLINDERS

[76] Inventor: Pier Andrea Rigazzi, Contrada San Marco 42, 6982 Agno, Switzerland

[21] Appl. No.: 09/297,324

[22] PCT Filed: Nov. 3, 1997

[86] PCT No.: PCT/IB97/01362

§ 371 Date: Apr. 29, 1999

§ 102(e) Date: Apr. 29, 1999

[87] PCT Pub. No.: WO98/20240

PCT Pub. Date: May 14, 1998

[30] Foreign Application Priority Data

| Nov. 7, 1996 | [CH] | Switzerland | 2752/96 |
| Feb. 3, 1997 | [CH] | Switzerland | 236/97 |
| Jun. 9, 1997 | [CH] | Switzerland | 1401/97 |
| Aug. 5, 1997 | [CH] | Switzerland | 1855/97 |

[51] Int. Cl.[7] ................................................ F02B 19/16
[52] U.S. Cl. .................... 123/261; 123/268; 123/275; 123/281
[58] Field of Search .................... 123/255, 261, 123/268, 275, 281, 283

[56] References Cited

U.S. PATENT DOCUMENTS

| 1,454,972 | 5/1923 | Lowe | 123/255 |
| 1,671,826 | 5/1928 | Joslyn | 123/281 |
| 3,035,559 | 5/1962 | Brandes et al. | 123/275 |
| 3,386,422 | 6/1968 | Eyzat | 123/275 |
| 3,583,372 | 6/1971 | Hoffmann | 123/275 |
| 3,610,211 | 10/1971 | Hoffmann | 123/275 |
| 3,738,332 | 6/1973 | Eyzat et al. | 123/275 |
| 5,664,541 | 9/1997 | Yoo | 123/275 |

FOREIGN PATENT DOCUMENTS

| 80944 | 11/1950 | Poland | 123/275 |
| 63965 | 11/1922 | Sweden | 123/275 |

*Primary Examiner*—Erick Solis
*Attorney, Agent, or Firm*—Young & Thompson

[57] ABSTRACT

Process for ensuring the mixing of a predetermined quantity of liquid or gaseous fuel with the air that is contained in a pre-chamber with one end that is open toward cylinders of an alternative internal-combustion engine, as well as the ignition of the mixture with the fuel being injected axially from closed end of the pre-chamber by an injector that is actuated by a predefined surplus of pressure compared to that which is present in the pre-chamber itself, the injection is a accomplished during the terminal phase of the compression half-cycle, whereby the injector and surplus are such as to ensure the fuel jet which is injected is completely evaporated and/or mixed with the air that is contained in the pre-chamber at the moment when it reaches the open end of the pre-chamber and which, during its translation motion, mixes with the above-mentioned air according to mixture richness values that can be represented by a predetermined curve that rises from injection point (A) towards center (C) of the open-end of the pre-chamber.

15 Claims, 1 Drawing Sheet

PROCESS FOR THE FORMATION OF A FUEL MIXTURE AND FOR ITS IGNITION IN A PRE-CHAMBER THAT IS OPEN TOWARD THE CYLINDERS

BACKGROUND OF THE INVENTION

This invention pertains to pre-chambers, and more particularly to pre-chambers which are open at the end that empties into the cylinder or cylinders of an alternative internal-combustion engine, preferably of the in-line type.

DESCRIPTION OF THE RELATED ART

These pre-chambers have been described by the same applicant in previous applications in which it was disclosed that, in order to determine their operation, it was necessary to inject into them the fuel that was required to saturate, with a preset richness, at least part of the mass of air contained therein.

The combustion of the mixture, thereby projecting the combusted gases into the remaining air contained in the cylinders into which fuel is not injected, takes place at a fairly low temperature and in the presence of a sufficient surplus of air ($\lambda$=4–10) to guarantee that there will be no polluting components such as CO and $NO_x$, in the exhaust gases.

Even though the principle has been shown to be valid, tests conducted on prototypes have revealed a drawback that makes it very difficult to achieve a percentage of pollutants and uncombusted products that is effectively equal to zero.

This is due to the fact that, after the "primary" combustion phase in the pre-chamber, the bulk of the uncombusted residues contained therein cools down, under the action of the simultaneous expansion due to the corresponding travel of the piston, to temperatures below their ignition limit without any force having been able to eject them into the cylinders and therefore, ultimately, without having had a chance to undergo the "secondary combustion" that is characteristic of the kind of engines in question here which offer the results promised above.

In other words, with a generic process for saturation of the pre-chamber, results are achieved with regard to the composition of the exhaust gases that are better than with conventional engines but that do not effectively reach zero as regards the total percentage of undesirable components.

SUMMARY OF THE INVENTION

Other examples of the prior art differ from that disclosed by the present application and they do not even merely mention the features on which it is based, mainly because their aim was different: aims of the present application are in fact to keep the temperature of combustion of the flame below the $NO_x$ formation temperature of 1500–1600° K., as well as to fully scavenge the pre-chamber after the combustion end, whereas, for example, U.S. Pat. Nos. 5,024,193 and 4,926,818 are aimed to better ignite the remaining mixture inside the cylinders, and Great Britain Patent 2 123 482 is aimed to better mix fuel with the total volume of air contained inside a pre-chamber for enhancing the combustion.

Other examples of the prior art differ from that disclosed by the present application and they do not even merely mention the features on which it is based, mainly because their aim was different: aims of the present application are in fact to keep the temperature of combustion of the flame below the 1500° K., as well as to fully scavenge the pre-chamber after the combustion end, whereas, for example, U.S. Pat. No. 5,024,193 and U.S. Pat. No. 4,926,818 are aimed to better ignite the remaining mixture inside the cylinders, and Pat. GB-A-2 123 482 is aimed to better mix fuel with the total volume of air contained inside a pre-chamber for enhancing the combustion.

The inventor of this invention has devised a process for saturating a pre-chamber and for igniting the mixture that avoids the above-mentioned drawbacks and guarantees a percentage of pollutants in the exhaust gas that is effectively equal to zero.

The inventor has, in fact, devised a process in which, by injecting a liquid or gaseous fuel, stratification is achieved of the mixture with variable richness levels along the axis of the pre-chamber with a portion of the volume of air contained therein which basically does not mix with the fuel and which, by expanding during the return of the piston, pushes the combusted gases contained in the pre-chamber towards the cylinder before the temperature in the latter drops below their ignition limit.

In particular, the subject of this invention consists of a process for ensuring the mixing of a preset quantity of fuel according to the preamble to claim 1, characterized by the characterizing part of said claim.

BRIEF DESCRIPTION OF THE DRAWINGS

The inventive process will now be described in greater detail, also making reference to the attached drawings, where.

DESCRIPTION OF THE PREFERRED EMBODIMENTS

Figure 1:
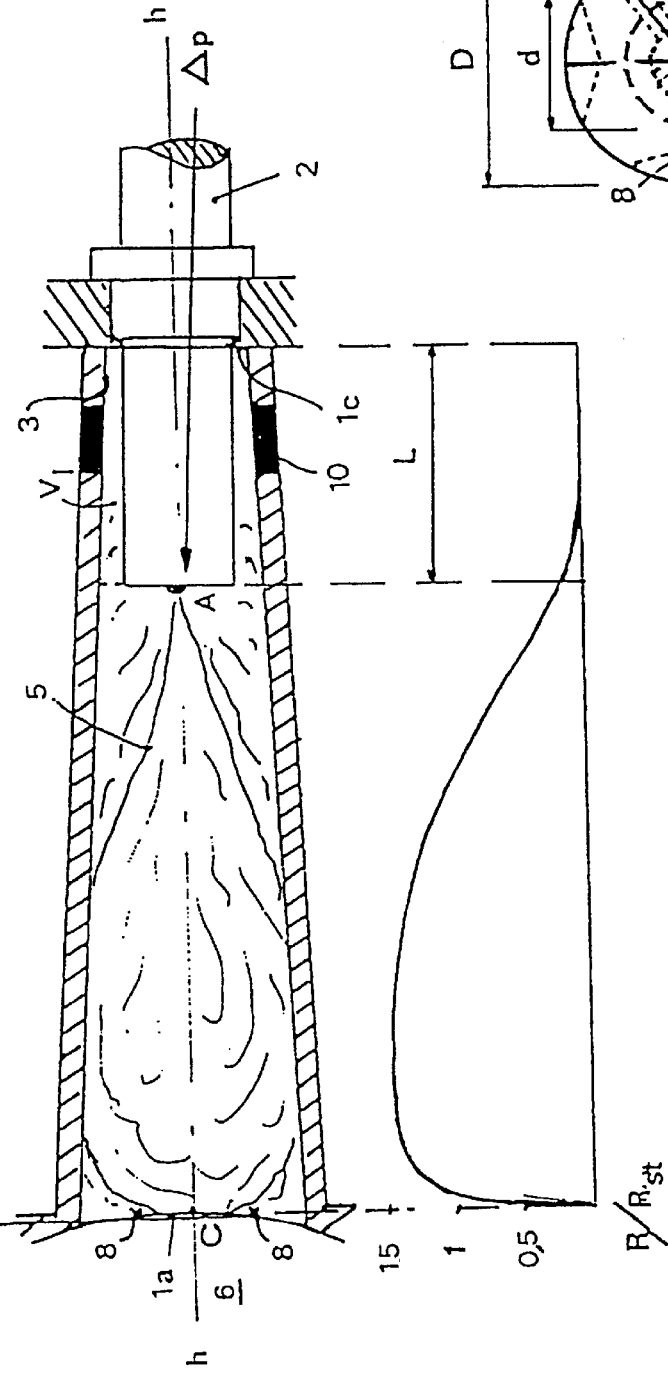
FIG. 1 shows the longitudinal section of a pre-chamber, paired with a diagram of the richness of the mixture along its axis, obtained according to the process of the invention (R=richness and $R_{st}$=stoichiometric richness)

Consider FIG. 1: the fuel is injected along axis h—h of pre-chamber 1 which, in the case shown, is a truncated cone and has a circular open end 1a that empties into cylinders 6 from an injector 2, which is actuated by a surplus of pressure $\Delta p$ with respect to the pressures that are present in the pre-chamber during injection, which is set at other closed end 1c of pre-chamber 1.

Said fuel forms a jet 5 which is also in the shape of a cone or frustrated cone, depending on the type of injector.

In order to implement the process of the invention, it is necessary to size the nozzles of injector 2 and to calculate injection surplus $\Delta p$ in such a way that, with injection done during the terminal phase of the compression half-cycle of the internal-combustion engine, the sizes of the droplets that are formed (in the case of a liquid fuel), as well as their kinetic energy and their distribution over the straight sections of pre-chamber 1, are such as to guarantee the complete evaporation of jet 5 immediately before the instant when it reaches center C of the opening of pre-chamber 1 and to ensure mixing of the fuel vapors with the air that is contained in the pre-chamber, thus providing increasing levels of richness from injection point A in the direction of said center C of the pre-chamber opening.

In the cases where the fuel is gaseous (methane or similar gases), it is necessary to perform the above-mentioned calculations and sizing in such a way that injected gas 5, when it reaches center C, is mixed by similar means with the air that is contained in the part of the pre-chamber that is located downstream from injector 2.

It should be possible therefore to represent the above-mentioned richness levels with a line that is approximately similar to curve 7 shown in FIG. 1 parallel to pre-chamber 1.

This approach ensures that a preset volume $V_1$ of the air that is contained in the pre-chamber which is behind its closed end 1c where injector 2 is installed has a very low average richness level, with a portion of it that basically does not mix with the fuel.

If care is taken to ensure that this volume has a value equal to or, preferably, greater by a preset amount than the total volume of the pre-chamber, divided by the compression ratio that is achieved in a certain cycle of the internal-combustion engine, the result is that this volume of air which, among other things, is first heated by radiation from the combustion that takes place in the pre-chamber, expands to a specified extent during the expansion phase of the engine itself, thereby "washing" the combusted gases that are present during this phase with which it is also mixed, partially increasing the ratio of oxygen/CO+uncombusted products before they are cooled and pushing them into the cylinders, where the combusted gases themselves can undergo secondary combustion of a preset duration (for example, 3–4 msec) owing to the temperature that prevails in the cylinders themselves; in the meantime, this temperature should not drop below the ignition limits.

The "washing" in question also removes any uncombusted HC that may be left against the walls of pre-chamber 1; in order to better achieve this goal, it is advisable for these walls to be made "shiny" by means of, for example, chrome-plating, grinding, or other processes that provide similar results.

In order to achieve average richness values in said volume $V_1$ that are appropriately low even when the fuel is gaseous, the inventor suggests that injector 2 be inserted into pre-chamber 1 by a preset length L, thereby limiting said volume $V_1$ upstream from the nozzle between the outside walls of the injector and inner surface 3 of pre-chamber 1 close to its closed end 1c.

Another possible improvement is to supply, where necessary, a given quantity of heat, for example by means of a resistor 10, to the air that is contained in said volume $V_1$, in such a way as to facilitate the combustion of the lean mixture with which it mixes, thereby expanding.

During the course of the tests mentioned above, it was also noted that, if a single ignition point at center C of opening 1a is used, there arises the drawback that a certain percentage of mixture that is not yet combusted is initially expelled toward cylinders 6, where the temperature is still slightly below the temperature required for its ignition.

This is due to the action of the front of the initial globe of flame which, as it expands radially from said center C, exerts pressure on the mixture in the pre-chamber that is not yet combusted, thereby causing it to reach the walls of pre-chamber 1 without enough speed to guarantee the timely coverage of the whole section of the latter in order to avoid the discharge of uncombusted products.

A certain percentage of uncombusted mixture, pushed by its expansion due to the movement of the piston, therefore reaches cylinder 6 without burning and has to be combusted during the course of the secondary combustion that takes place inside the cylinder itself by the entry of the already combusted hot gases into pre-chamber 1.

This involves a real, if limited, increase in the likelihood of uncombusted CO and HC being present in the exhaust gases.

Figure 2:
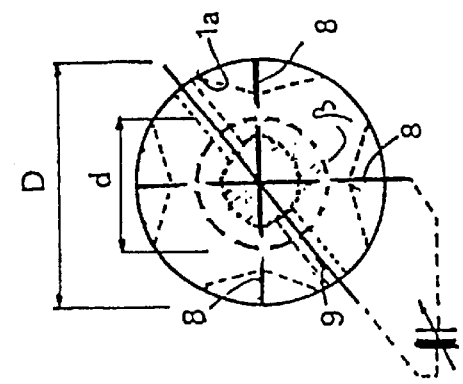
FIG. 2 shows a front view of the opening and of the pre-chamber of FIG. 1 with an ignition device mounted thereon that is able to optimize the results of the process that is the subject of the invention.

In order to avoid this drawback, the inventor of this process calls for using a number of ignition priming points 8 that are arranged on a plane which is perpendicular to the axis of pre-chamber 1 (see FIG. 2) and arranged corresponding to its open end 1a, preferably passing through its above-mentioned center C.

The presence of a number of priming points considerably reduces the time (a few tenths of a millisecond) that it takes for a flame front that is regular enough and large enough to cover the entire section of pre-chamber 1, thereby "sealing it" with an overpressure and thus preventing the discharge of uncombusted mixture.

One solution that is suggested is (FIG. 2) to use an electrode with four tips arranged in a cross, whereby said electrode is attached to the opening of pre-chamber 1 by means of an arm 9 that is made of conductive material which is attached to one pole of a direct-current discharge generator. Each tip faces a pointed terminal 8 that is connected to the other pole, only one of which is shown in the drawing (the required insulating parts are not shown). By generating discharges according to the ignition processes using coils or electronic devices, four simultaneous priming points are thus created. Clearly, there can be more than four pairs of tips and terminals, but the applicant has found that a satisfactory solution consists of using only four priming points as described above, arranged along a circumference β that is concentric with opening 1a and has a diameter d that is equal to half of diameter D of the latter.

In order to ensure convenient implementation of the process of the invention, the inventor also suggests that pre-chamber 1 be sized in such a way that its volume is between ⅕ and ½ of the volume of the dead space that is left by the engine piston in cylinder 6 relative to when it has reached the dead center corresponding to maximum compression.

A total λ (=total air/stoichiometric air) is thus obtained that is between 20 and 8, with average temperatures of the thermodynamic cycle of around 300° C. which do not require either lubrication or cooling of the engine.

The inventor also anticipates that the amount of fuel that is injected during the cycle will be such that the heat produced by its combustion in pre-chamber 1 will be sufficient to raise the temperature of the entire mass of air contained in cylinder or cylinders 6 and in pre-chamber 1 enough to guarantee that, during the return and expansion that the piston accomplishes after ignition according to a given speed curve, this temperature will be kept above the ignition temperature of the fuel for a preset time (for example,≧4–10 msec).

The example that is described and shown is intended to be neither limiting nor binding with respect to other implementations of the process based on the concepts set forth in the attached claims. The guideline values indicated may, among other things, be varied according to requirements, for example, depending on the type of fuel used (gasoline, alcohol, diesel fuel, gas, etc.). The above-mentioned implementations that are thus achieved still fall within the framework of the protection that is conferred by this patent application.

It is advantageous if, in the process according to the invention, the time of the end of compression during the travel of the piston coincides with the moment of the end of injection, but slight deviations from this condition do not represent significant disadvantages.

Similarly, it is possible to have the moment of ignition slightly lead the instant of reversal of the direction of motion of piston in order to achieve, according to well-known criteria, better yield from the thermodynamic cycle.

It is considered useful to provide a numerical example of the sizing of a pre-chamber 1 and corresponding volume $V_1$, suitable for implementing the process described above.

Assume that the volume of the "active" part of the pre-chamber that holds the air which is to be mixed with the fuel is 5 cm$^3$, that the peak absolute pressure during combustion is equal to 25 bar, and that the temperature in cylinders 6 is kept above the minimum combustion temperature (approximately 400° C.) for 7 msec after this peak. If it is also assumed that the combusted gases contained in the pre-chamber undergo secondary combustion lasting 4 msec, the problem is to determine the pressure in the cylinders 4 msec before the moment when this limit is reached beyond which combustion no longer takes place.

Assuming that, given the curve of the speed of expansion of the piston in the case in question, this pressure is 10 bar, this means that, in order to ensure the desired washing of the pre-chamber at the proper time, said volume $V_1$ must be such as to have occupied the entire pre-chamber (i.e., the "active" part plus $V_1$) after having expanded adiabatically 1.9 times. It is then found that the following equation is verified:

Total volume of the pre-chamber="active" volume+$V_1$=1.9$V_1$, or: $V_1$+5 cm$^3$=1.9 $V_1$, or: $V_{1b=5/0.9}$ cm$^3$=5.6 cm$^3$.

If the compression ratio $\rho$ in the cycle in question is 8.5:1, and if, as we see, the total volume of the pre-chamber (active part+$V_1$) is equal to (5+5.6)=10.6 cm$^3$, it is possible to establish a coefficient $\epsilon$ that is equal to the ratio between the total volume of the pre-chamber and $\epsilon$, which in this case is $\epsilon$=10.6/8.6=1.25.

As we see, volume $V_1$ is 4.5 times larger than the above-mentioned value of $\epsilon$.

In the rough calculations of maximum value presented above, no allowance was made for the limited compression that volume $V_1$ experiences due to the increase in the pressure between the dead center of maximum compression and the above-mentioned pressure peak due to combustion. When making definitive, more accurate calculations, it is necessary to make allowance for this fact, thereby oversizing volume $V_1$.

Still accomplishing the above-described intrinsic washing of pre-chamber 1, the inventor suggests looking for an implementation of the process in which the flame front that forms just after ignition close to opening 1a of pre-chamber 1 remain essentially in this position throughout the entire duration of combustion, such that the combusted gases immediately escape from the pre-chamber during their combustion, thereby mixing with the air that is left in the cylinders without having been able to reach, anywhere in the space thus occupied, the activation temperature (of approximately 1500 K) for the nitrogen oxidation reaction.

For this purpose, it is necessary that pre-chamber 1 be sized and shaped such that, during the interval of time when the primary combustion takes place in it, said volume $V_1$ that contains air that is not mixed with fuel expands under the action of the outward motion of the piston until it basically occupies its entire volume.

This means a fall-back of the combustion front at a speed, relative to the pre-chamber, that is equal to and opposite from the speed of advance of the combustion, with the result that said front remains virtually stationary throughout entire duration of the primary combustion, in a desirable position corresponding to or close to the point (the area close to electrodes 8) where the flame front from the combustion is formed.

In order to accomplish this, it is sufficient for, e.g., the ratio between the total volume of pre-chamber 1 and said volume $V_1$ that contains air which is not mixed with fuel to be essentially equal to the compression ratio that would result in the rise in pressure, at a constant volume, that would be found in the cycle in question due to the action of the combustion if the cycle itself were of the Otto type.

Because what is described above takes place, it is, of course, necessary that, in any cycle, the duration of the primary combustion be equal to the time that it takes for the piston to accomplish the above-described expansion, and therefore the injection time and pressure parameters be adjusted, and that both the mass of the piston and the dimensions of the pre-chamber (which can also be cylindrical) and of its opening 1a be appropriately sized; said opening may also be limited as regards its final cross-section in order to reduce the dead space and to increase the discharge speed of the gases that are combusted during primary combustion, thereby increasing the turbulence that is produced by these gases. The above-mentioned reduction in the final discharge cross-section of the pre-chamber can be achieved by increasing the dimensions of the electrodes that produce the priming tips: doing this (see, for example, the dotted lines in FIG. 2) reduces the maximum thickness of the flame, thereby reducing the temperature inside it to the desired extent, and there is also a thermal fly-wheel which absorbs by radiation and convection the thermal rise "tips" of the flame that is formed.

In the case where there are two pre-chambers that are mirror images of one another and that empty into a central combustion chamber which is arranged between them, the electrodes of the two pre-chambers, which then are also mirror opposites, can be advantageously mounted "displaced" angularly from one other to a preset extent, causing them to rotate around the longitudinal axis of the corresponding pre-chamber at a specified angle.

Doing this ensures that the sheets of flame that exit through their openings form pronounced vortices when they meet in this central combustion chamber (this case is not depicted in the figures).

Another advantageous improvement called for by the inventor consists in equipping the pre-chambers with means that are able to vary volume $V_1$ when the operating regime of the engine varies. This can be done by using the technologies that are already known and are used to vary, for example, the volume of the air inlets for air supply in some of the more recent models of engines.

Proceeding along these lines makes it possible to ensure better monitoring of the positioning of the flame front in any regime.

What is claimed is:

1. Process for ensuring the mixing of a preset quantity of liquid or gaseous fuel with the air that is contained in a pre-chamber (1) with one end (1a) that is open toward a cylinder in a reciprocating internal combustion engine in which no fuel is injected into said cylinder, as well as the ignition of the mixture that is thus obtained, with the fuel being injected axially from a closed end (1c) of pre-chamber (1) by an injector (2) that is actuated by a surplus of pressure ($\Delta p$) compared to that which is present in the pre-chamber itself, whereby said injection of fuel is accomplished during the compression half-cycle of the internal combustion engine, and the injector (2) and the surplus ($\Delta p$) that ensures its delivery are such as to ensure that the fuel jet (5) that is injected is at least completely evaporated or mixed with the air contained in the pre-chamber (1) at the moment when the fuel jet reaches said open end (1a) of the pre-chamber itself and that, during its translation movement, it is mixed with the above-mentioned air in accordance with richness values (R) of the mixture which can be represented with a preset curve (7) that rises from the injection point (a) towards a center (C) of said open end (1a) of the pre-chamber (1), wherein the average richness value of the mixture in a defined volume of air ($V_1$) located near the closed end (1c) of the pre-chamber (1) is substantially zero, the pre-chamber (1) being sized such that, during the interval of time in which combustion takes place therein, said volume ($V_1$) that contains air expands under the action of the withdrawal motion of the piston or pistons, ultimately occupying its entire volume and keeping the position of the combustion front essentially close to the opening (1a) of the pre-chamber (1) for the entire duration of said combustion.

2. Process according to claim 1, wherein said volume ($V_1$) in which the richness of the mixture is zero is modified when the operating regime of the engine varies.

3. Process according to claim 1, wherein the injector (2) is inserted by a predetermined length (L) into the pre-chamber (1) in such a way as to define a preset volume of air ($V_1$) that is contained between an outer surface and an inner surface (3) of the pre-chamber (1), upstream from the injector nozzle, in which the average value of the richness of the mixture is substantially zero.

4. Process according to claim 1 whereby said volume ($V_1$) is equal to or greater than the volume of the pre-chamber (1) divided by the compression ratio that is achieved in the internal combustion engine.

5. Process according to claim 1, whereby a predetermined amount of heat is fed to the air that is contained in said volume ($V_1$).

6. Process according to claim 1, in which ignition is accomplished at the moment when the piston of the internal-combustion engine has reached the dead center of maximum compression.

7. Process according to claim 1, wherein ignition is accomplished by producing a number of electric discharges whose priming points are located on a plane ($\gamma$) that is perpendicular to the axis of the pre-chamber (1) and is arranged corresponding to the open end (1a) of said pre-chamber.

8. Process according to claim 7, wherein the open end (1a) of the pre-chamber (1) is circular and there are four of priming points (8) which are arranged around a circumference ($\beta$) that is concentric with regard to the circular open end (1a) of the pre-chamber and has a diameter (d) which is equal to half of a diameter (D) of the pre-chamber.

9. Process according to claim 1, wherein the total volume of the pre-chamber (1) is between ⅕ and ½ of the volume of the dead space that is left by the piston of the internal-combustion engine, corresponding to maximum compression.

10. Process according to claim 1, wherein a quantity of fuel is injected during each cycle such that the heat produced by its combustion in the pre-chamber (1) is sufficient to raise the temperature of the entire mass of air contained in the cylinder (6) and in the pre-chamber (1) itself so as to guarantee that, during the return and expansion that the piston accomplishes according to a given speed curve, this temperature is kept above the fuel ignition temperature for a predetermined time.

11. Process according to claim 1, wherein the internal walls of the pre-chamber (1) are made "shiny" by chrome-plating, grinding, or other methods that provide similar results.

12. The method of claim 1, wherein the fuel jet that is injected is completely evaporated with the air contained in the pre-chamber at the moment the fuel jet reaches the open end.

13. The method of claim 1, wherein the fuel jet that is injected is completely mixed with the air contained in the pre-chamber at the moment the fuel jet reaches the open end.

14. The method of claim 1, wherein the fuel jet that is injected is completely evaporated and mixed with the air contained in the pre-chamber at the moment the fuel jet reaches the open end.

15. The method of claim 1, wherein a temperature of a flame front of the combustion front is always maintained lower than a $NO_x$ formation temperature of the flame front.

* * * * *